(12) United States Patent
Nakamura

(10) Patent No.: US 6,286,575 B1
(45) Date of Patent: Sep. 11, 2001

(54) PNEUMATIC TIRE FOR FRONT WHEEL OF MOTORCYCLE

(75) Inventor: Tsutomu Nakamura, Tokorozawa (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/448,426

(22) Filed: Nov. 24, 1999

(30) Foreign Application Priority Data

| Nov. 26, 1998 | (JP) | 10-335160 |
| Dec. 14, 1998 | (JP) | 10-354838 |
| Dec. 15, 1998 | (JP) | 10-355596 |
| Dec. 15, 1998 | (JP) | 10-356126 |

(51) Int. Cl.$^7$ .................................................. B60L 9/00
(52) U.S. Cl. ........................ 152/526; 152/532; 152/533; 152/549
(58) Field of Search .................... 152/454, 532, 152/533, 536, 555, 209.11, 526

(56) References Cited

U.S. PATENT DOCUMENTS

| 4,588,009 | 5/1986 | Kitazawa | 152/209 |
| 5,647,929 | * 7/1997 | Suzuki | 152/530 |

FOREIGN PATENT DOCUMENTS

| 0 620 131 | 1/1997 | (EP) | B60C/15/06 |
| 0719506 | 8/1995 | (JP) | B60C/11/00 |
| 408216619-A | * 8/1996 | (JP) | |
| 2000158910 | 6/2000 | (JP) | B60C/11/00 |

* cited by examiner

*Primary Examiner*—Michael W. Ball
*Assistant Examiner*—Justin Fischer
(74) *Attorney, Agent, or Firm*—Sughrue, Mion, Zinn, Macpeak & Seas, PLLC

(57) ABSTRACT

A pneumatic tire for a front wheel of a motorcycle comprises a pair of bead cores, a radial carcass toroidally extending between the pair of bead portions, a belt disposed on a radially outer surface of the carcass, and a tread portion disposed thereon, wherein the carcass is comprised of at least one carcass ply containing organic fiber cords, and the belt is a spiral belt layer formed by spirally winding a continuous rubberized cord or a continuous ribbon-shaped body containing plural cords therein in a widthwise direction of the tire, and the tread portion has a two-layer structure comprised of a cap rubber layer and a base rubber layer in at least a central region in the widthwise direction of the tire, or a reinforcing layer is disposed inside an innermost carcass ply or on an inner surface of an innerliner, or the bead core is a helically wound laminate of a single steel wire having a polygonal shape at a section of the bead core in the radial direction.

2 Claims, 10 Drawing Sheets

PNEUMATIC TIRE FOR FRONT WHEEL OF MOTORCYCLE

BACKGROUND OF THE INVENTION

1. Field of the Invention

This invention relates to pneumatic tires for motorcycles, and more particularly to a pneumatic tire for a front wheel of a motorcycle capable of preventing the occurrence of shimmy in the high-speed running to improve a steering stability, particularly straight running stability.

2. Description of Related Art

In the pneumatic tire particularly mounted onto a front wheel of a motorcycle, the steering performances such as handling and the like are considered to be important, so that it is usual to adopt a belt comprised of at least two belt layers, cords of which belt layers being crossed with each other, or so-called cross structure belt up to the present time.

With the recent advancement of weight reduction and higher performances in a vehicle, a micro-oscillation of a handle or so-called shimmy phenomenon is actualized in the motorcycle. Particularly, it is strongly demanded to prevent the occurrence of shimmy at a high frequency zone. However, the tire having the above cross structure belt is difficult to flexibly absorb the pushing up of micro-irregularities on the road to the tread surface of the tire and the micro-oscillation of the handle resulted therefrom.

And also, the motorcycle is more important to ensure the stability of the vehicle body in the high speed or extra-high speed running. In the above pneumatic tire for the motorcycle, however, the pushing quantity of a central portion of the tread becomes large with the increase of the speed to decrease the ground contacting area of the tread, which causes the lowering of the stability in the high speed running.

On the other hand, a tire having a belt formed by spirally winding a cord having a high modulus of elasticity such as high-modulus polyester or rayon fiber cord, aromatic polyamide fiber cord or the like on the outer periphery of the carcass ply in a widthwise direction of the tire or so-called spiral structure belt is used for a rear wheel of the motorcycle. This tire has many characteristics that the outward pushing of the tread is prevented by hoop effect of the spiral structure belt even in the high speed running, and heat generation and rolling resistance are small owing to small movement of tread rubber, and the wear resistance is excellent, and the decrease of the ground contacting area with the rise of the speed is small. However, when the tire having the above spiral structure belt is used in the front wheel of the motorcycle taking count of steering performances such as steering stability and the like, since the cord in the belt extends substantially in the circumferential direction of the tire, the bending rigidity of the tread portion in the widthwise direction thereof is too low as compared with the cross structure belt, and hence the handle response, gripping force on road surface and the like are largely lacking and the steering performances are degraded. Therefore, the tire having the spiral structure belt is not used in the front wheel of the motorcycle.

SUMMARY OF THE INVENTION

It is, therefore, an object of the invention to provide a pneumatic tire for a front wheel of a motorcycle capable of preventing the occurrence of shimmy at a high frequency zone and improving the steering stability in the high speed running.

The inventor has noticed that the tire having the spiral structure belt has characteristics that the tread portion is flexible, the change of ground contact shape in the high speed running is less, the high speed stability is excellent and the like as compared with the conventional cross structure belt and made various studies in order to solve the problem of degrading the steering performances due to the low bending rigidity in the ground contacting region when such a tire is applied to the front wheel of the motorcycle and as a result, the invention has been accomplished.

According to a first aspect of the invention, there is the provision of a pneumatic tire for a front wheel of a motorcycle comprising a pair of bead cores embedded in a pair of bead portions, a carcass toroidally extending between the pair of bead portions and wound around the bead core from an inside of the tire toward an outside thereof, a belt disposed on an outer surface of a crown portion of the carcass in a radial direction of the tire, and a tread portion disposed on an outer surface of the belt in the radial direction, wherein the carcass is comprised of at least one carcass ply containing organic fiber cords arranged at a cord angle of 60–90° with respect to an equatorial plane of the tire, and the belt is a spiral belt layer formed by spirally winding a continuous rubberized cord or a continuous ribbon-shaped body containing plural cords therein in a widthwise direction of the tire so as to extend the cord substantially in a circumferential direction of the tire, and the tread portion has a two-layer structure comprised of a cap rubber layer and a base rubber layer in at least a central region in the widthwise direction of the tire.

In a preferable embodiment of the invention, a Shore A hardness of the cap rubber layer is harder than that of the base rubber layer, and the Shore A hardness of the cap rubber layer is within a range of 55–75°, and a difference of Shore A hardness between the cap rubber layer and the base rubber layer is not less than 2°, and thickness A of the cap rubber layer and thickness B of the base rubber layer satisfy a relation of $B/(A+B)=0.2$–$0.5$.

According to a second aspect of the invention, there is the provision of a pneumatic tire for a front wheel of a motorcycle comprising a pair of bead cores embedded in a pair of bead portions, a carcass toroidally extending between the pair of bead portions and wound around the bead core from an inside of the tire toward an outside thereof, a belt disposed on an outer surface of a crown portion of the carcass in a radial direction of the tire, and a tread portion disposed on an outer surface of the belt in the radial direction, wherein the carcass is comprised of at least one carcass ply containing organic fiber cords arranged at a cord angle of 60–90° with respect to an equatorial plane of the tire, and the belt is a spiral belt layer formed by spirally winding a continuous rubberized cord or a continuous ribbon-shaped body containing plural cords therein in a widthwise direction of the tire so as to extend the cord substantially in a circumferential direction of the tire, and at least one reinforcing layer each being symmetric with respect to the equatorial plane and disposed on the inside and directly adjacent an innermost carcass ply or on an inner surface of an innerliner at a width corresponding to 20–120% of a width of the spiral belt layer and is a rubber layer or a rubberized cord layer.

In a preferable embodiment of the invention, the width of the reinforcing layer is 20–60% of the width of the spiral belt layer.

According to a third aspect of the invention, there is the provision of a pneumatic tire for a front wheel of a motorcycle comprising a pair of bead cores embedded in a pair of bead portions, a carcass toroidally extending between the pair of bead portions and wound around the bead core from an inside of the tire toward an outside thereof, a belt disposed on an outer surface of a crown portion of the carcass in a radial direction of the tire, and a tread portion disposed on an outer surface of the belt in the radial direction, wherein the carcass is comprised of at least one carcass ply containing organic fiber cords arranged at a cord angle of 60–90° with respect to an equatorial plane of the tire, and the belt is a spiral belt layer formed by spirally winding a continuous rubberized cord or a continuous ribbon-shaped body containing plural cords therein in a widthwise direction of the tire so as to extend the cord substantially in a circumferential direction of the tire, and the bead core is a helically wound laminate of a single steel wire having a polygonal shape at a section of the bead core in the radial direction.

In a preferable embodiment of the invention, the radial section of the bead core is any one of quadrilateral shape to hexagonal shape.

According to a fourth aspect of the invention, there is the provision of a pneumatic tire for a front wheel of a motorcycle comprising a pair of bead cores embedded in a pair of bead portions, a carcass toroidally extending between the pair of bead portions, a belt disposed on an outer surface of a crown portion of the carcass in a radial direction of the tire, and a tread portion disposed on an outer surface of the belt in the radial direction, wherein the carcass is comprised of at least one carcass ply containing organic fiber cords arranged at a cord angle of 60–90° with respect to an equatorial plane of the tire and wound around the bead core from an inside of the tire toward an outside thereof to form a turnup portion, and the belt is a spiral belt layer formed by spirally winding a continuous rubberized cord or a continuous ribbon-shaped body containing plural cords therein in a widthwise direction of the tire so as to extend the cord substantially in a circumferential direction of the tire, and a bead filler having a Shore A hardness of 60–99° is arranged at an outside of the turnup portion of the carcass ply in an axial direction of the tire.

In a preferable embodiment of the invention, the carcass further comprises at least one down ply located at an outside of the turnup portion of the carcass ply and the bead filler is arranged at an outside of the down ply in an axial direction of the tire.

In another preferable embodiment of the invention, the carcass further comprises at least one down ply located at an outside of the turnup portion of the carcass ply and the bead filler is arranged between the turnup portion and the down ply.

BRIEF DESCRIPTION OF THE DRAWINGS

The invention will be described with reference to the accompanying drawings, wherein.

DESCRIPTION OF PREFERRED EMBODIMENTS

Figure 1:
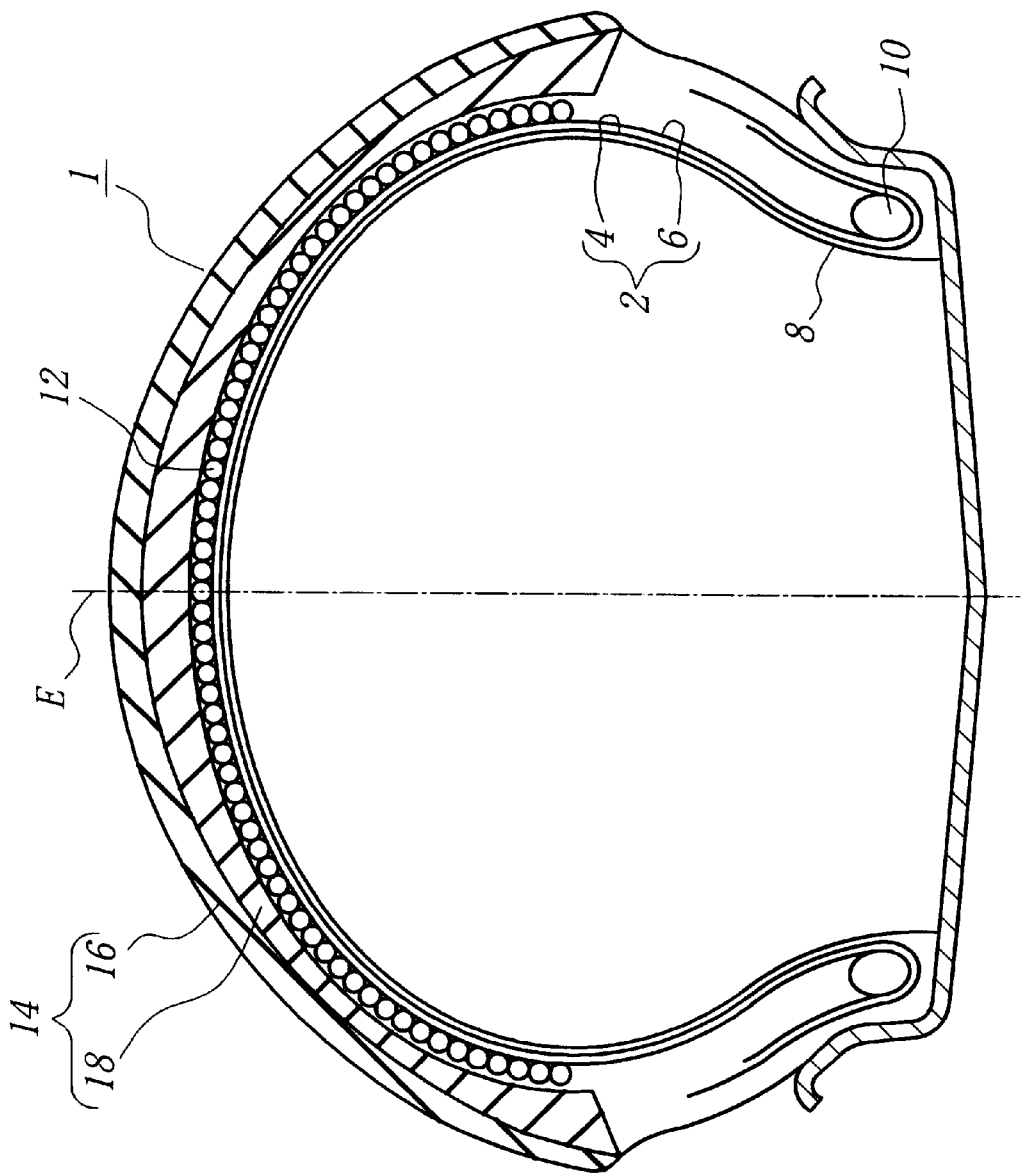
FIG. 1 is a diagrammatically section view of a first embodiment of the pneumatic tire for a front wheel of a motorcycle according to the invention.

In the pneumatic tire for the front wheel of the motorcycle according to the invention, the belt is a spiral belt layer formed by spirally winding a continuous rubberized cord or a continuous ribbon-shaped body containing plural cords therein in a widthwise direction of the tire so as to extend the cord substantially in a circumferential direction of the tire, so that the change of the ground contact shape of the tire is less even in the high speed running to improve the high speed durability, and the occurrence of shimmy is prevented and the stability of the vehicle body in the high speed running is improved as compared with the use of the conventional cross structure belt. However, since the spiral belt layer is a flexible structure and the bending rigidity of the tread portion is low, if only the spiral belt layer is used instead of the cross structure belt in the conventional pneumatic tire for the front wheel of the motorcycle, it can not be avoided to degrade the steering performances such as handling response, gripping force on road surface and the like.

In the first aspect of the invention, therefore, the flexibility inherent to the spiral belt layer is controlled by rendering the tread portion into a two-layer structure comprised of a cap rubber layer and a base rubber layer in at least a central region in the widthwise direction of the tire or so-called cap/base structure in at least a central region of the tread in the widthwise direction of the tire. The term "central region" used herein means a portion contacting with ground in the straight running and the cornering.

For example, when the front wheel is steered at a state of contacting the tire with road surface, the tread rubber between the tread surface and the belt is subjected to shearing force in a direction along the plane of the tread in the ground contacting region of the tread. When the thickness of the tread portion is thick as in a new tire, deviation between the steered angle and the tread surface moving angle becomes large and delay is created in the power transmission from the handle to the tread surface (or from the tread surface to the handle) and further the bending rigidity of the tread is low due to the spiral structure belt, whereby the handling nimbleness and response are degraded. On the other hand, when the thickness of the tread portion is thin, the deviation of the angle is small and the delay in the power transmission becomes small.

When the whole of the tread portion is made of rubber having a low hardness, since the rigidity of the tread is lacking, the shimmy of a large amplitude is caused in disturbance input to degrade the steering stability. On the contrary, according to the invention, the tread has the cap/base structure wherein rubber having a high hardness is used in one of the two rubber layers, so that the rigidity of the tread can sufficiently be ensured and the occurrence of shimmy can be prevented. Further, the shearing rigidity at a thick thread portion as in the new tire can be ensured and the flexibility of the spiral belt layer can be controlled, whereby it is possible to improve the high speed running stability and the handling nimbleness and response.

In the tread having the cap/base structure, when the hardness of the cap rubber layer is made higher than that of the base rubber layer, the shearing rigidity of the tread is low at a state of a new tire and tends to increase as the thickness of the tread becomes thin due to the wearing. That is, there is a tendency of decreasing the shearing deformation. As a result, the change of the shearing rigidity with the wearing of the tread is controlled and it is possible to hold the change of the handling performance at a small level.

When the Shore A hardness of the cap rubber layer is within a range of 55–75°, it is possible to surely and sufficiently improve the high speed running stability at a state of new tire and the handling nimbleness and response. If the Shore A hardness is less than 55°, the shearing rigidity of the tread required at a state of new tire and the controlling action to the flexible structure of the spiral belt layer can not be obtained and hence it is difficult to surely attain the high speed running stability at the new tire state and the handling nimbleness and response. While, if the Shore A hardness exceeds 75°, the cap rubber layer becomes too hard and the gap absorbing ability on road surface is extremely bad and the sufficient gripping force on road surface can not be obtained.

And also, if the difference of Shore A hardness between the cap rubber layer and the base rubber layer is less than 2°, the division of the tread into cap and base rubber layers is meaningless and also it is impossible to hold the change of the handling performance due to the wearing at a small level.

Furthermore, the thickness A of the cap rubber layer and the thickness B of the base rubber layer satisfy the ratio B/(A+B) of 0.2–0.5. When the ratio is less than 0.2, the thickness of the base rubber layer becomes too thin, so that even when the hardness of the base rubber layer is made low, it is impossible to hold the change of the handling performance at a small level. While, when the ratio exceeds 0.5, the thickness of the cap rubber layer becomes too thin, so that even when the hardness of the cap rubber layer is made high, it is impossible to ensure the shearing rigidity of the tread required at the new tire state and hence it is impossible to surely and sufficiently improve the high speed running stability at the new tire state and the handling nimbleness and response.

In the second aspect of the invention, at least one reinforcing layer is disposed inside an innermost carcass ply or on an inner surface of an innerliner at a width corresponding to 20–120% of a width of the spiral belt layer and is a rubber layer or a rubberized cord layer. In this case, the reinforcing layer is located outward from a bending neutral axis against the bending behavior of the tread portion under loading at a given distance, so that the bending rigidity of the tread is improved. And also, the shearing rigidity between the tread surface and the carcass ply is not lowered, which does not badly affect the behavior of transmitting power produced on the tread surface through the belt and the carcass ply to the vehicle body (for example, lowering of cornering force, lowering of response thereto and the like) and hence the high speed running stability, gripping force and steering performance are held at a high level.

There is a possibility that the reinforcing layer may be disposed between the carcass plies or outside the outermost carcass ply. In this case, the bending rigidity of the tread portion can be improved, but the shearing rigidity between the tread surface and the carcass ply lowers to create a large loss, which badly affects the behavior of transmitting power produced on the tread surface through the belt and the carcass ply to the vehicle body, and hence the effect of highly improving the high speed running stability, gripping force or steering performance can not be expected.

In the third aspect of the invention, the bead core is constituted with a helically wound laminate of a single steel wire having a polygonal shape at a section of the bead core in the radial direction, preferably any one of quadrilateral shape to hexagonal shape. In this case, the single steel wire is continuous in both widthwise direction and radial direction of the bead core, so that the high rigidity can be developed in each of the widthwise direction at the radial section of the bead core and the torsional direction around a central axis of the bead core. Therefore, such a bead core can develop a high deformation resistance against the tensile force of the cord in the carcass ply under the high rigidity in all directions. Consequently, the bending rigidity of the tread portion is largely increased at the section of the tire in the width-wise direction while maintaining properties inherent to this type of the tire, whereby the steering stability can sufficiently be ensured with the improvement of the handling response, gripping force on road surface and the like.

In the fourth aspect of the invention, the bead filler having the Shore A hardness of 60–99° is arranged at the outside of the turnup portion of the carcass ply in the axial direction of the tire, whereby the bending rigidity of the sidewall portion is increased to avoid the lowering of the steering performance. In this case, rubber having a Shore A hardness higher than that of rubber used in the sidewall portion can be used as the bead filler. When the Shore A hardness of the bead filler is outside the above range, the handling response, gripping force on road surface and the like are not sufficiently improved and also the steering performance of the tire using the spiral belt layer is not ensured. When the carcass is comprised of a carcass ply wound around the bead core from the inside toward the outside to form a turnup portion and a down ply located at an outside of the turnup portion, the bead filler is arranged at an outside of the down ply or between the turnup portion and the down ply.

In all of the pneumatic tires according to the invention, the carcass is comprised of at least one carcass ply containing organic fiber cords arranged at a cord angle of 60–90° with respect to an equatorial plane of the tire. When the cord angle is less than 60°, the tire is easily deformed by lateral force and the merit using the carcass ply of radial structure is lost. Various embodiments of the pneumatic tire for the front wheel of the motorcycle according to the invention will be described with reference to the drawings.

In FIG. 1 is shown a first embodiment of the tire according to the invention, wherein numeral 1 is a pneumatic tire for the front wheel of the motorcycle (not shown), and numeral 2 a carcass comprised of two carcass plies 4, 6. In each of the carcass plies 4, 6 are embedded a plurality of organic fiber cords such as nylon cords so as to extend at a cord angle of 60–90° with respect to an equatorial plane E of the tire.

The tire 1 comprises a belt 12 disposed on an outer periphery of the carcass 2 in a radial direction of the tire. The belt 12 is a spiral belt layer formed by spirally winding a continuous rubberized cord or a continuous ribbon-shaped body containing plural cords therein in a widthwise direction of the tire so as to extend the cord substantially in a circumferential direction of the tire. As the cord is preferably used a high strength and high tenacity aramid fiber cord (Kevlar, trade name) or the like.

A tread 14 is disposed on an outer periphery of the belt 12 in the radial direction and has so-called cap/base structure. In the illustrated embodiment, the tread 14 is comprised of a cap rubber layer 16 and a base rubber layer 18 over a whole of the tread in a widthwise direction thereof. In such a cap/base structure, a Shore A hardness of the cap rubber layer 16 is made higher than that of the base rubber layer 18 and the difference of Shore A hardness between the cap rubber layer and the base rubber layer is set to be not less than 2°. Further, the cap rubber layer 16 and the base rubber layer 18 satisfy a relation that a ratio B/(A+B) is within a range of 0.2–0.5 wherein A is a thickness of the cap rubber layer and B is a thickness of the base rubber layer.

In the tire 1 according to the invention, a crown portion of the carcass 2 is reinforced with the spiral belt layer 12, so that the high speed durability is excellent as compared with the conventional tire using a cross structure belt.

Furthermore, the flexible structure of the spiral belt layer 12 is reinforced with the cap rubber layer 16 having a relatively high hardness. And also, the cap rubber layer 16 ensures the shearing rigidity of the tread 14 at a state that the thickness of the tread is relatively thick as in a new tire. As a result, the high speed running stability at the new tire state and the handling nimbleness and response are excellent.

Moreover, the hardness of the cap rubber layer 16 is set to be higher than that of the base rubber layer 18, whereby it is possible to control the rising ratio of the shearing rigidity in the tread 14 as the wearing increases and hence it is possible to hold the change of the shearing rigidity or the change of the steering performance from new tire state to last worn state at a small level. In addition, the sufficient rigidity of the tread can be ensured, so that the occurrence of shimmy can be prevented as compared with the case that the whole of the tread is made of only rubber having a low hardness.

Figure 2:
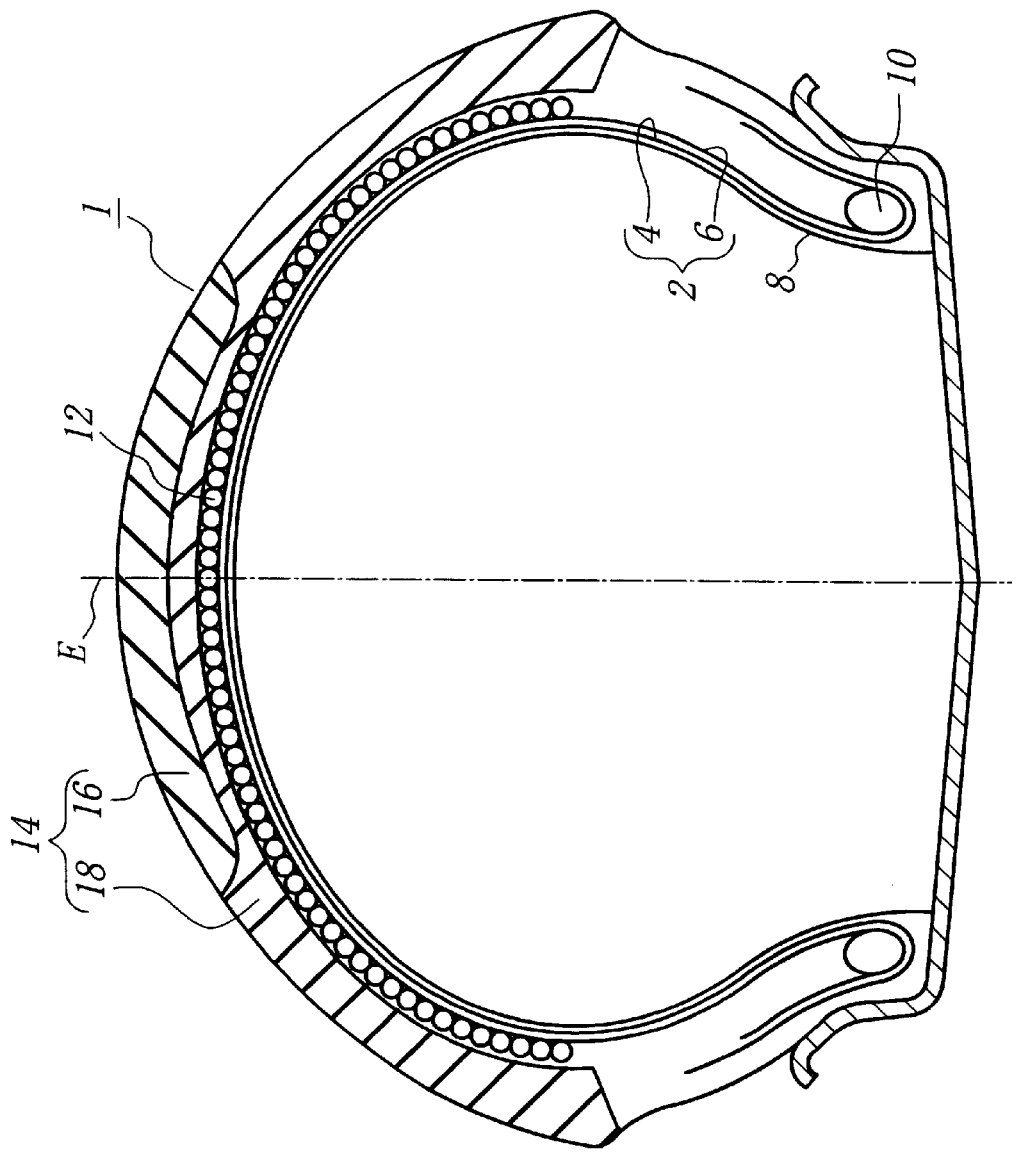
FIG. 2 is a diagrammatically section view of a second embodiment of the pneumatic tire for a front wheel of a motorcycle according to the invention.

In FIG. 2 is shown a second embodiment of the pneumatic tire for the front wheel of the motorcycle according to the invention. This tire is a modified embodiment of FIG. 1, wherein the cap rubber layer 16 is disposed in only a central portion of the tread in the widthwise direction of the tire. Even in this case, there can be obtained substantially the same effects as in the first embodiment.

Figure 3:
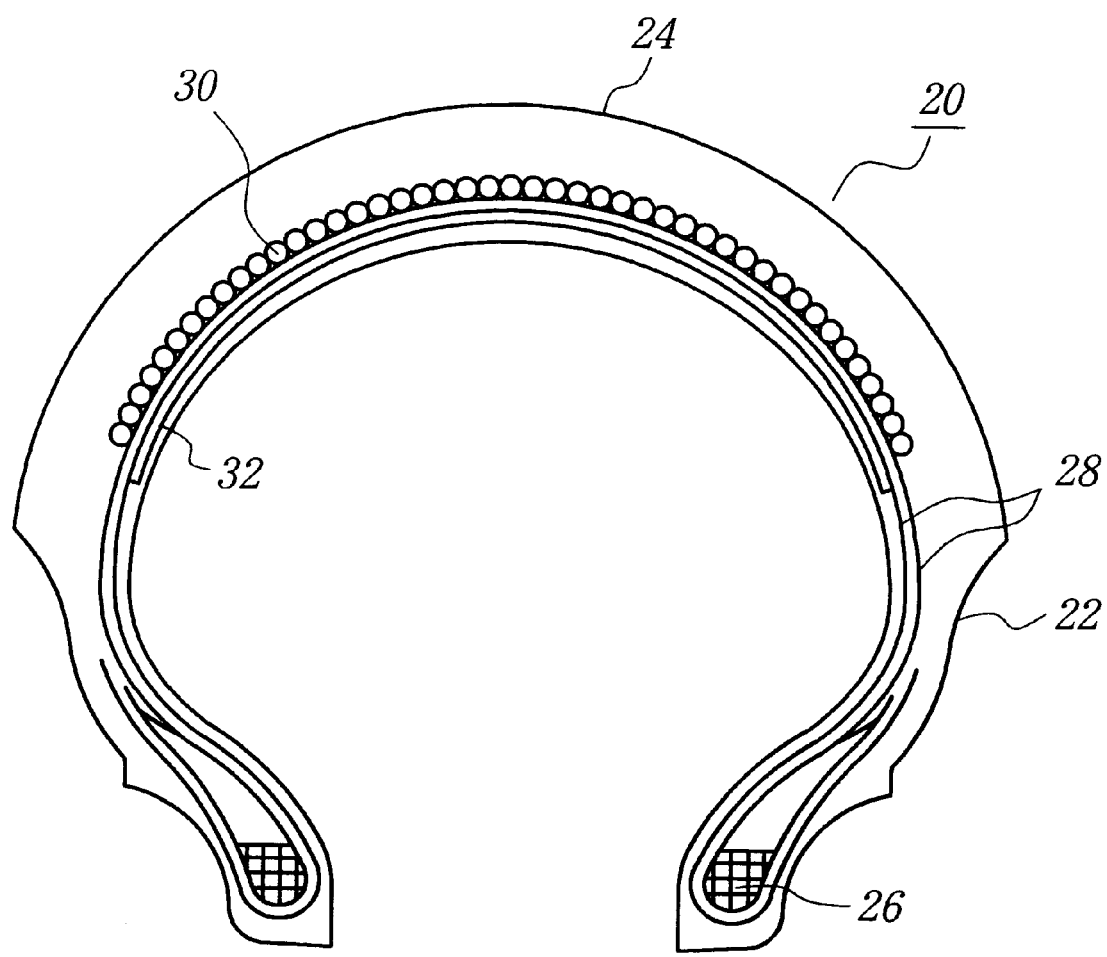
FIG. 3 is a diagrammatically section view of a third embodiment of the pneumatic tire for a front wheel of a motorcycle according to the invention.

In FIG. 3 is shown a third embodiment of the pneumatic tire for the front wheel of the motorcycle according to the invention, wherein numeral 20 is a pneumatic tire, numeral 22 a sidewall portion, numeral 24 a tread portion extending between a pair of the sidewall portions 22, numeral 26 a bead core, and numeral 28 a carcass toroidally extending between a pair of the bead cores 26. The carcass 28 is comprised of two rubberized plies each containing organic fiber cords arranged at a cord angle of 60–90° with respect to the equatorial plane of the tire.

Further, numeral 30 is a belt disposed on an outer periphery of the carcass 28 in the radial direction, which is a spiral belt layer formed by spirally winding a continuous rubberized cord or a continuous ribbon-shaped body containing plural cords therein in a widthwise direction of the tire so as to extend the cord substantially in a circumferential direction of the tire, and numeral 32 a reinforcing layer arranged inside the carcass 28 in the radial direction. The reinforcing layer 32 has a width corresponding to 20–120% of a width of the spiral belt layer 30. In the illustrated embodiment, the width of the reinforcing layer 32 is 110% of the width of the spiral belt layer 30.

In a comparative pneumatic tire having no reinforcing layer, it is difficult to hold the bending rigidity and shearing rigidity of the tread at a high level and freely adjust the balance between these rigidities. In the invention, however, the bending rigidity of the tread under loading and the shearing rigidity in a region ranging from the surface of the tread 24 to the carcass 28 can be held at a high level by arranging the reinforcing layer 32, whereby it is possible to prevent the degradation of the steering performance inevitably caused when only the spiral belt layer is used instead of the cross structure belt in the conventional pneumatic tire.

Figure 4:
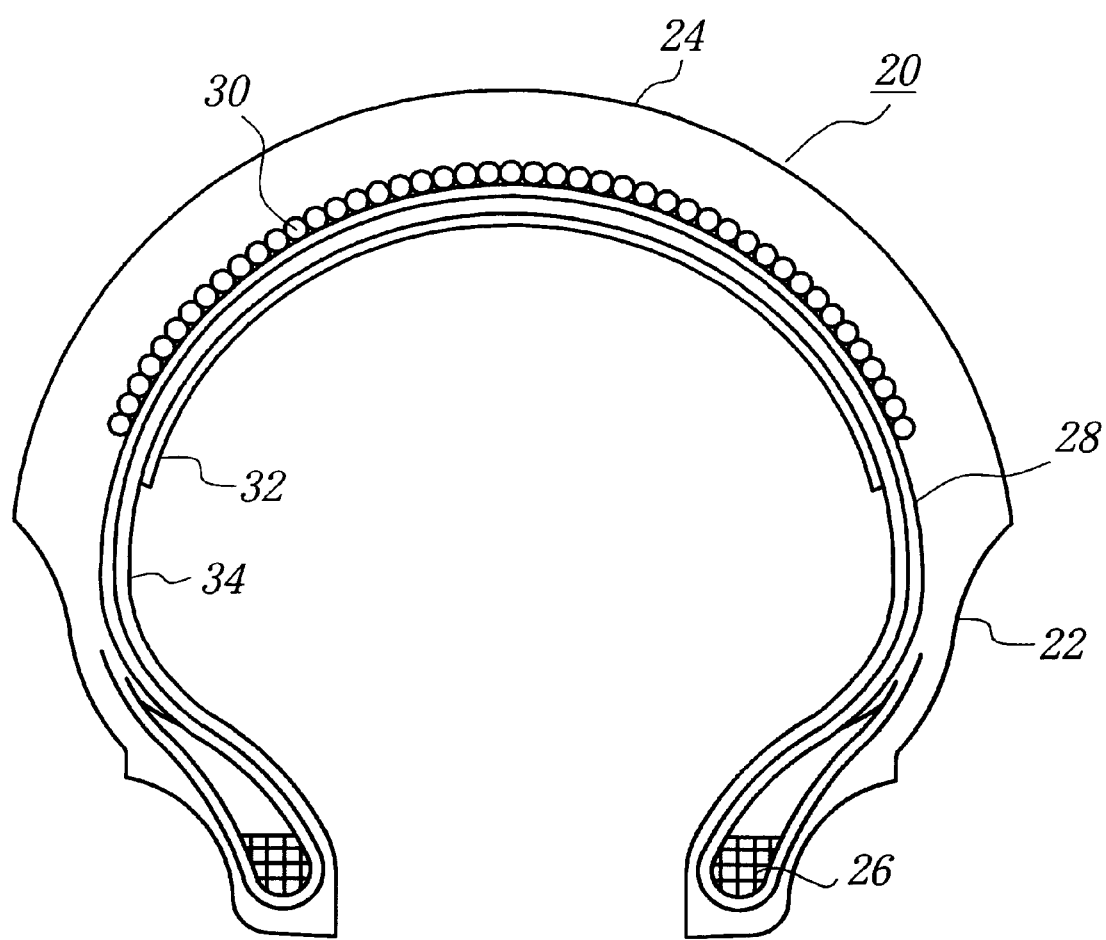
FIG. 4 is a diagrammatically section view of a fourth embodiment of the pneumatic tire for a front wheel of a motorcycle according to the invention.

In FIG. 4 is a fourth embodiment of the pneumatic tire for the front wheel of the motorcycle according to the invention, wherein the reinforcing layer 32 is arranged on a surface of an innerliner 34 (or inner surface of the tire in the radial direction). Even in this tire, not only the bending rigidity of the tread but also the shearing rigidity between the tread surface and the carcass are held at a high level.

Figure 5:
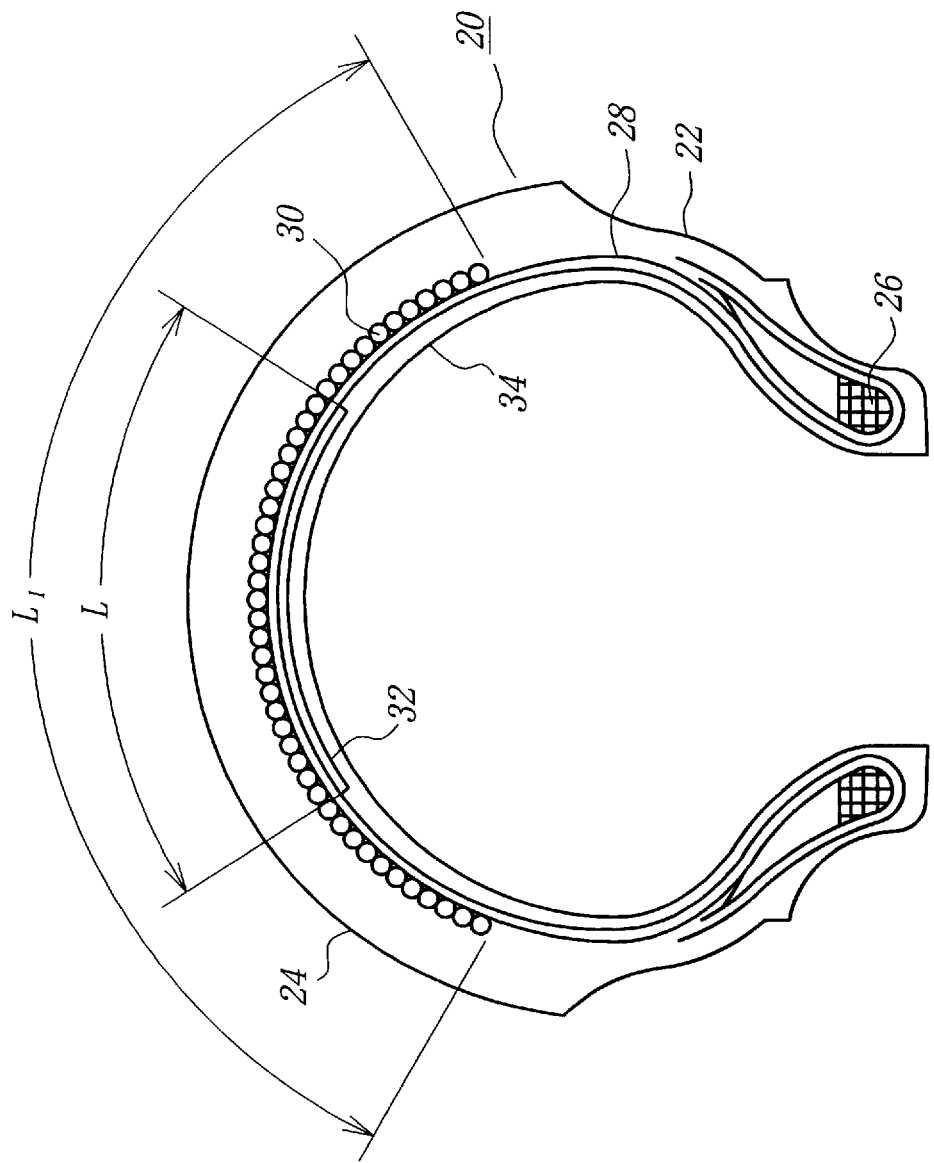
FIG. 5 is a diagrammatically section view of a fifth embodiment of the pneumatic tire for a front wheel of a motorcycle according to the invention.

In FIG. 5 is a fifth embodiment of the pneumatic tire for the front wheel of the motorcycle according to the invention, wherein the reinforcing layer 32 is arranged inside the carcass 28 at a width L corresponding to 20–60% of the width $L_1$ of the spiral belt layer 30. In this case, the reinforcing layer 32 may be arranged on the surface of the innerliner 34 likewise the case of FIG. 4. Even in the case of using such a narrow-width reinforcing layer, it is possible to improve the steering performances, and particularly the grip feeling in the cornering and handling nimbleness are improved as compared with the case of using the wide-width reinforcing layer as shown in FIGS. 3 and 4.

When the width L of the reinforcing layer is outside the range corresponding to 20–120% of the width $L_1$ of the spiral belt layer, the bending rigidity of the sidewall portion becomes too high and the steering performances are degraded. Particularly, when the width L is within a range of 20–60% of the width $L_1$, the adequate rigidity of the tread is ensured, whereby it possible to obtain the balance among prevention of shimmy, steering stability, handling nimbleness and grip feeling in the cornering at a high level.

As the reinforcing layer is used a rubber sheet in the illustrated embodiment, but one or more rubberized cord layers may be used.

Figure 6:
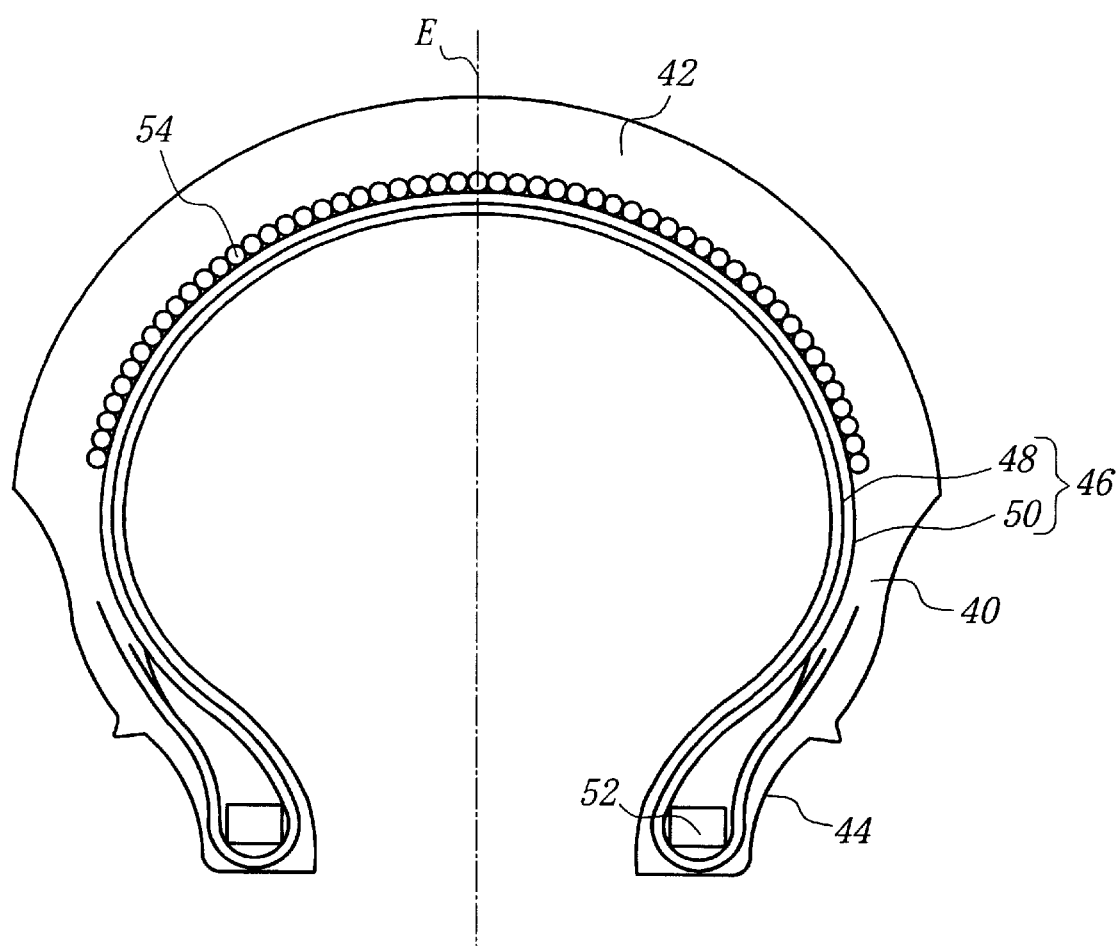
FIG. 6 is a diagrammatically section view of a sixth embodiment of the pneumatic tire for a front wheel of a motorcycle according to the invention.

In FIG. 6 is shown a sixth embodiment of the pneumatic tire for the front wheel of the motorcycle according to the invention, wherein numeral 40 is a sidewall portion, numeral 42 a tread portion extending between the pair of the sidewall portions 40, and numeral 44 a bead portion located inward from the sidewall portion 40 in the radial direction.

Numeral 46 is a carcass comprised of two rubberized carcass plies 48, 50 each containing organic fiber cords such as nylon-6,6 cords arranged at a cord angle of 60–90° with respect to an equatorial plane E of the tire and reinforcing both the sidewall portions 40 and the tread portion 40. Each end portion of the carcass plies 48, 50 is wound around a bead core 52 embedded in the bead portion 44 from an inside of the tire toward an outside thereof.

Numeral 54 is a belt disposed on an outer periphery of a crown portion of the carcass 46, which is a spiral belt layer formed by spirally winding a continuous rubberized cord or a continuous ribbon-shaped body containing plural cords therein in a widthwise direction of the tire so as to extend the cord substantially in a circumferential direction of the tire. In this case, the cord is made of an organic fiber having a high modulus of elasticity such as high modulus polyester fiber, polyvinyl alcohol fiber, rayon fiber, aromatic polyamide fiber or the like and has a modulus of elasticity of not less than 600 kgf/cm². The belt 54 can develop a high rigidity in the radial direction of the tire because the cord extends in the circumferential direction of the tire.

The bead core 52 embedded in the bead portion 44 for ensuring the fitting of the tire to a rim (not shown) is constituted with a helically wound laminate of a single steel wire having a polygonal shape at a section of the bead core in the radial direction. FIGS. 7a to 7e concretely show various sectional shapes of the bead core 52, respectively.

Figure 7A:
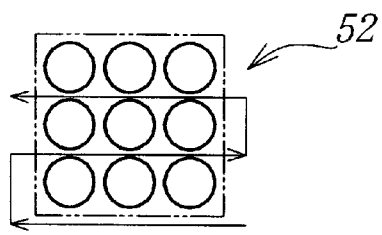
FIGS. 7a to 7e are schematic views of various sectional shapes in the bead core according to the invention.

The bead core 52 shown in FIG. 7a is a three-layer laminate structure formed by helically winding the single steel wire three times in the widthwise direction of the bead core, and then helically winding on an outer periphery thereof three times, and further helically winding on an outer periphery thereof three times and has a sectional profile of approximately a square. The bead core 52 shown in FIG. 7b has a sectional profile of approximately a square formed by repeating the helical winding of four times over four stages. The bead core 52 shown in FIG. 7c has a sectional profile of approximately a hexagon formed by repeating the helical windings of two times, three times and two times from an inner peripheral side of the tire in the radial direction over three stages. The bead core 52 shown in FIG. 7d has a sectional profile of approximately a hexagon formed by repeating the helical windings of three times, four times and three times from an inner peripheral side of the tire in the radial direction over three stages. The bead core 52 shown in FIG. 7e has a sectional profile of approximately a hexagon formed by repeating the helical windings of two times, three times, four times and three times from an inner peripheral side of the tire in the radial direction over four stages. Moreover, the sectional profile of the bead core 52 may be pentagonal.

In this case, it is favorable that the single steel wire is helically wound and laminated in such a manner that a side of the polygon form the base when the bead core 52 is embedded in the bead portion 44 for increasing air tightness between a bead base of the bead portion and a bead seat of the rim and improving the resistance to rim slippage and realizing the strong connection between the bead portion and the rim.

In the tire of FIG. 6, the high rigidity is obtained by the bead core 52 in the widthwise direction at the radial section and in the torsional direction around the axial line of the bead core, whereby the bending rigidity of the tread is advantageously increased at the section in the widthwise direction of the tire. Therefore, when such a tire is used for the front wheel of the motorcycle, the steering stability can largely be improved without damaging the properties inherent to this tire.

Figure 8:
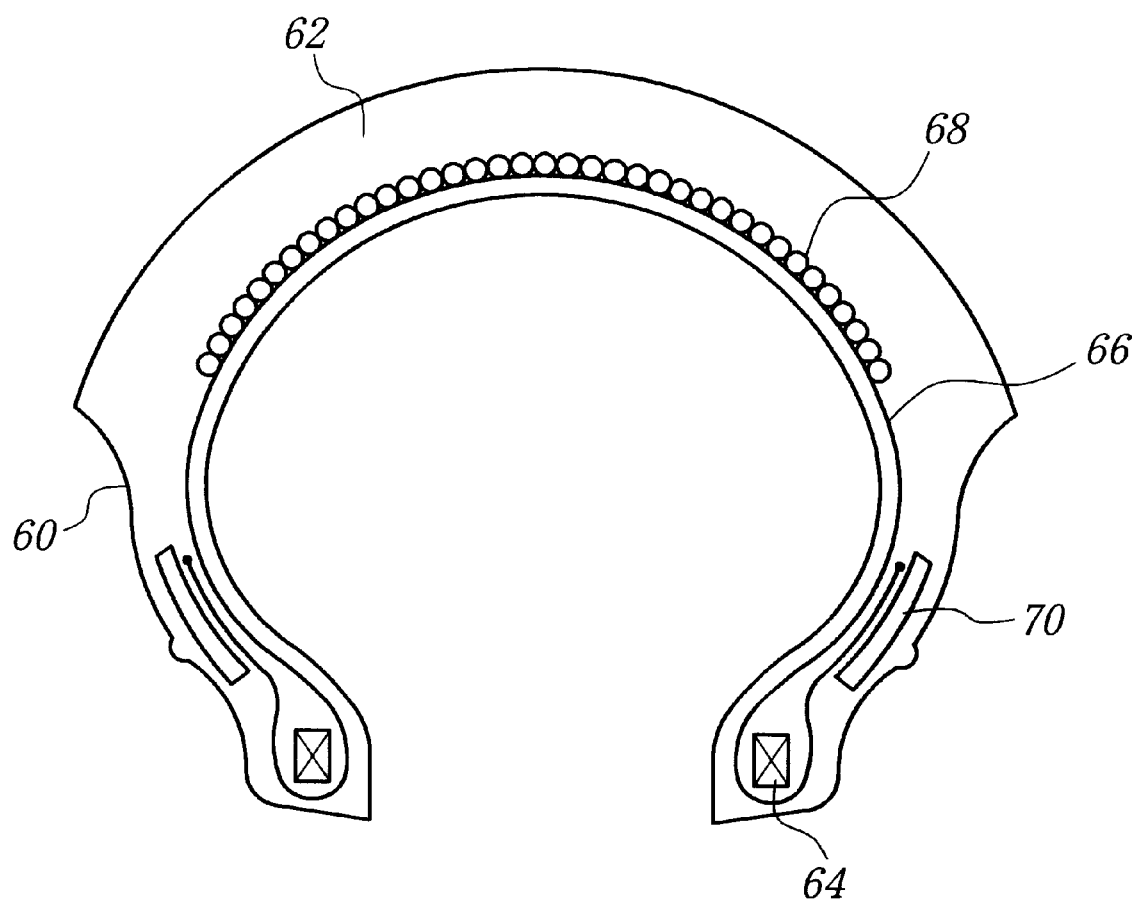
FIGS. 8 to 10 are diagrammatically section views of seventh to ninth embodiments of the pneumatic tire for a front wheel of a motorcycle according to the invention, respectively.

In FIG. 8 is shown a seventh embodiment of the pneumatic tire for the front wheel of the motorcycle according to the invention, wherein numeral 60 is a sidewall portion, numeral 62 a tread extending between a pair of the sidewall portions 60, numeral 64 a bead core, numeral 66 a carcass ply containing organic fiber cords arranged at a cord angle of 60–90° with respect to an equatorial plane of the tire and wound around the bead core 64 form an inside of the tire toward an outside thereof to form a turnup portion.

Numeral 68 is a belt disposed on an outer periphery of a crown portion of the carcass ply 66, which is a spiral belt layer formed by spirally winding a continuous rubberized cord or a continuous ribbon-shaped body containing plural cords therein in a widthwise direction of the tire so as to extend the cord substantially in a circumferential direction of the tire. Numeral 70 is a bead filler made of rubber having a Shore hardness of 60–99° and arranged at the outside of the turnup portion of the carcass ply 66.

In the tire of FIG. 8, the bead filler 70 is located at a position of creating a largest bending in the occurrence of lateral force under a load, whereby the bending rigidity of the sidewall portion is improved to ensure shearing rigidity between the tread and the spiral belt layer for the prevention of shimmy and hence the steering performance is improved.

Figure 9:
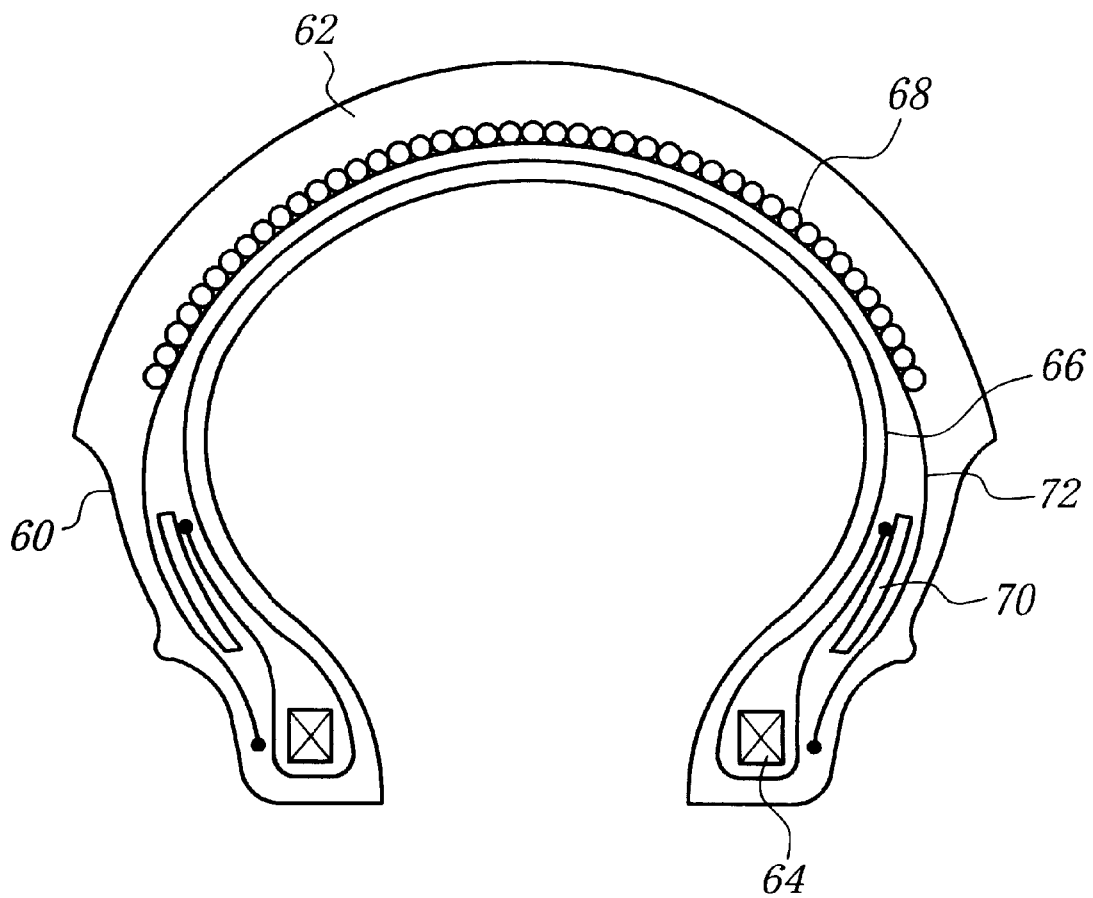

In FIG. 9 is shown an eighth embodiment of the pneumatic tire for a front wheel of a motorcycle according to the invention, which has the same basic structure as in FIG. 8 except that a down ply 72 is arranged at the outside of the carcass ply 66 and the bead filler 70 is arranged between the turnup portion of the carcass ply 66 and the down ply 72. In this case, the bead filler is located at a position relatively near to a neutral axis of the bending of the sidewall portion, whereby a middle rigidity in the lateral direction is obtained.

Figure 10:
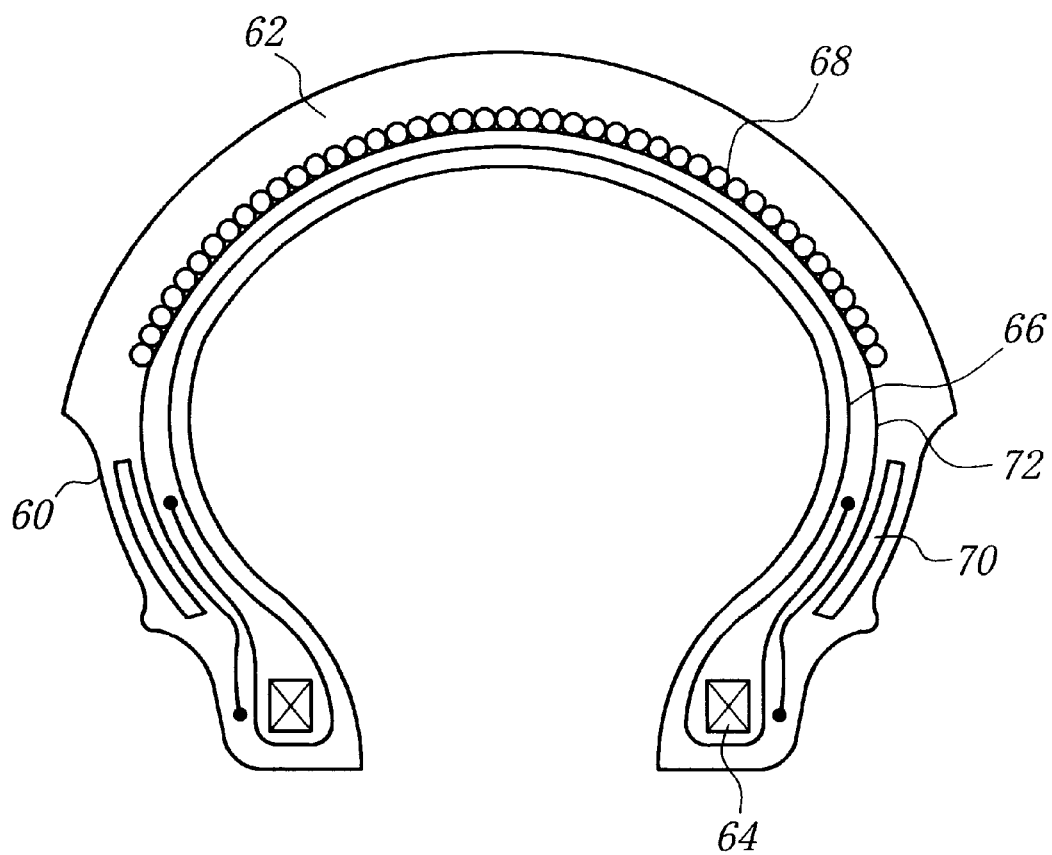

In FIG. 10 is shown a ninth embodiment of the pneumatic tire for a front wheel of a motorcycle according to the invention, which has the same basic structure as in FIG. 8 except that a down ply 72 is arranged at the outside of the carcass ply 66 and the bead filler 70 is arranged at the outside of the down ply 72. In this case, the bead filler is located at a position most apart from the neutral axis of the bending of the sidewall portion, whereby a highest rigidity in the lateral direction is obtained.

The following examples are given in illustration of the invention and are not intended as limitations thereof.

1. Each property is represented by an index on the basis that the tire of Conventional Example 1 is 100, wherein the larger the index value, the better the property.

Moreover, the term "over-steering of handle" used herein means a phenomenon that when the vehicle body of the motorcycle is slightly tilted, the handle tends to further over-steer inward in the tilting direction owing to the peculiarity of tire/machine. As the over-steering becomes large, it is difficult to steer the handle by the rider.

TABLE 1

| | High-speed straight running stability (index) | | Shimmy resistance (index) | | Handling nimbleness/ response (index) | | One-steering of handle at a low speed (index) | |
|---|---|---|---|---|---|---|---|---|
| | at new tire | at wearing | at new tire | at wearing | at new tire | at wearing | at new tire | at wearing |
| Conventional Example 1 One-piece high hardness rubber (Hd = 62°) | 100 | 100 | 100 | 100 | 100 | 100 | 100 | 100 |
| Conventional Example 2 One-piece low hardness rubber (Hd = 56°) | 80 | 100 | 90 | 100 | 80 | 100 | 120 | 140 |
| Example 1 Cap rubber layer (Hd = 60°, thickness, 4 mm) Base rubber layer (Hd = 56°, thickness: 2 mm) | 98 | 100 | 100 | 100 | 98 | 100 | 115 | 130 |
| Remarks (Characteristics of Example as compared with Conventional Examples) | At new tire, there is no caused poor lateral stiffness, which is problem in one-piece low hardness rubber and the absorption of wobbling is good. The property suitable for a heavy weight motorcycle is held likewise Conventional Example 1 using one-piece high hardness rubber. | | At new tire, there is not caused shimmy of a large amplitude in disturbance input due to the poor lateral stiffness, which is problem in the one-piece low hardness rubber. That is, the shimmy resistance is improved by lateral stiffness higher than that of the tire in Conventional Example 2. | | At new tire, poor handling performance due to the poor lateral stiffness, which is problem in the one-piece low hardness rubber, is reinforced with the high hardness rubber, whereby the reaction in the steering is improved as compared with the tire of Conventional Example 2. | | At wearing, the over-steering of handle at low speed, which is problem in the use of the one-piece high hardness rubber, is solved. | |

EXAMPLE 1, CONVENTIONAL EXAMPLES 1–2

There are provided three tires of Example 1 and Conventional Examples 1 and 2 for use in a front wheel of a motorcycle, respectively.

In the tire of Example 1, the tread has a cap/base structure shown in FIG. 1. In the conventional tires, the tread is made of a single rubber. The hardness of rubber constituting the tread and the like is shown in Table 1. Moreover, all of these tires have two carcass plies containing nylon cords therein and a spiral belt layer containing Kevlar cords therein.

Each of these tires is mounted onto a front wheel of a motorcycle (HONDA CBR1100XX) and actually run on a test circuit course by a professional rider, during which the high-speed straight running stability, shimmy resistance, handling nimbleness/response and over-steering of handle at a low speed are evaluated to obtain results as shown in Table

EXAMPLES 2–3, COMPARATIVE EXAMPLES 1–3

There are provided two pneumatic tires having a tire size of 120/70ZR17 and a basic structure shown in FIG. 3 comprising a carcass of two nylon cord plies and a spiral belt layer of Kevlar cord with a belt width of 140 mm, wherein the tire of Example 2 is provided with a rubber sheet located inside an innermost carcass ply and having a thickness of 0.5 mm and a width of 70 mm as a reinforcing layer, and the tire of Example 3 is provided with a rubberized nylon cord layer of 840 d located inside the innermost carcass ply as a reinforcing layer. Each of these tires is mounted onto a front wheel of a motorcycle (HONDA CB1100XX) and actually run at a high speed (250 km/h), during which the straight running stability, shimmy resistance, handling nimbleness/response, cornering force/gripping force and ride comfort are measured together with a tire of Comparative Example 1 having no reinforcing layer, a tire of Comparative Example 2 having the rubber sheet disposed between the belt and the carcass ply as a reinforcing layer and a tire of Comparative Example 3 having the rubber sheet disposed between the carcass plies as a reinforcing layer.

When all of the measured results are represented by an index on the basis that the tire of Comparative Example 1 is 100 (the larger the index value, the better the property), the tire of Comparative Example 2 has the straight running stability of 90, shimmy resistance of 130, handling nimbleness/response of 110, cornering force/gripping force of 90 and ride comfort of about 85, and the tire of Comparative Example 3 has the straight running stability of 80, shimmy resistance of 120, handling nimbleness/ response of 100, cornering force/gripping force of 80 and ride comfort of about 90.

On the other hand, the tire of Example 2 has the straight running stability of 110, shimmy resistance of 110, handling nimbleness/response of 110, cornering force/gripping force of 100 and ride comfort of about 100, and the tire of Example 3 has the straight running stability of 120, shimmy resistance of 120, handling nimbleness/response of 120, cornering force/gripping force of 95 and ride comfort of about 90.

As to the high-speed straight running stability of the tires of Examples 2 and 3, the deformation of the tire in both lateral and torsional directions becomes small as compared with those of Comparative Examples 1–3, and the absorption of wobbling (the wobbling is an oscillation of not more than 10 Hz in a whole of a frame and a handle produced at a high speed zone and the speed zone generating such an oscillation differs in accordance with the kind of the motorcycle and the condition (not less than 150 km/h in CB1100XX)) is improved, which is confirmed to contribute to the improvement of the high-speed straight running stability.

As to the shimmy resistance, the tire deformation in the lateral and torsional directions is small and the amplitude in disturbance input tends to be small. As to the handling nimbleness/response, the reaction of the vehicle body is improved in the steering of the handle. As to the cornering force/gripping force, the occurrence of lateral force becomes large and the falling-down inherent to the motorcycle in the cornering is decreased and the cornering force is improved.

As to the ride comfort, the thrusting in the riding on projection becomes somewhat sharp in the tires according to the invention, but since the tread portion is soft, the absolute level of the ride comfort is sufficiently put into practical use.

EXAMPLES 4–6, CONVENTIONAL EXAMPLE 3

There are provided three pneumatic tires having a tire size of 120/70ZR17 and a structure shown in FIG. 6, wherein a carcass is comprised of two plies each containing nylon cords arranged at a cord angle of 80° with respect to an equatorial plane of the tire and a belt is constituted with a spiral belt layer of an aromatic polyamide fiber cord. Each of these tires is mounted onto a front wheel of a motorcycle (HONDA CB1100XX) and actually run at a high speed, during which the straight running stability, shimmy resistance, handling nimbleness/response, cornering force/gripping force and ride comfort are measured by a professional rider to obtain results as shown in Table 2. Moreover, each of these results is represented by an index on the basis that the tire of Conventional Example 3 is 100, wherein the larger the index value, the better the property.

Figure 7B:
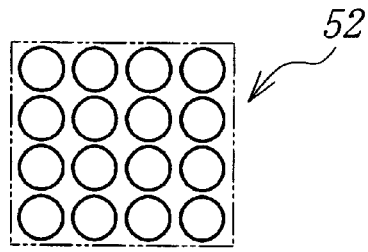
Figure 7C:
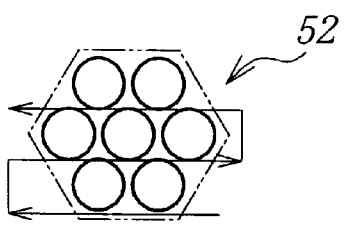
Figure 7D:
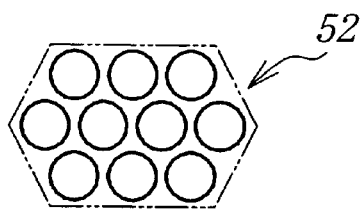
Figure 7E:
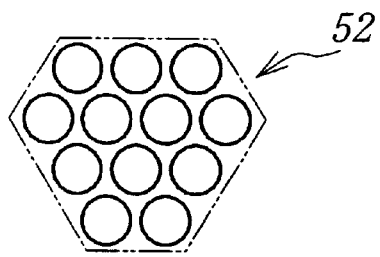

The tire of Example 4 uses a bead core shown in FIG. 7b, and the tire of Example 5 uses a bead core shown in FIG. 7c, and the tire of Example 6 uses a bead core shown in FIG. 7d. On the other hand, the tire of Conventional Example 3 uses a bead core formed by helically winding four steel wires arranged side by side in four laminated layers. The other structure of the tire is the same in all of the tires.

TABLE 2

|  | High-speed straight running stability | Shimmy resistance | Handling nimbleness/ response | Cornering force/ gripping force | Ridge comfort |
| --- | --- | --- | --- | --- | --- |
| Conventional Example 3 | 100 | 100 | 100 | 100 | 100 |
| Example 4 | 130 | 130 | 110 | 120 | 85 |
| Example 5 | 120 | 115 | 110 | 120 | 100 |
| Example 6 | 130 | 130 | 110 | 130 | 95 |
| Remarks (Characteristics of Example as compared with Conventional Example) | Deformation in the lateral direction and torsional direction around a radial line segment is small, and the absorption of wobbling is improved. | Deformation in the lateral direction and torsional direction around a radial line segment is small, and the amplitude in disturbance input is small. | The reaction of the motorcycle is particularly improved in the steering of the handle. | Camber thrust is large and hence the falling-down inherent to the motorcycle in the cornering is decreased to improve the cornering force itself. | The thrusting in the riding on projection becomes somewhat sharp, but the absolute level of the ride comfort is sufficiently high owing to the softness of the tread portion. |

EXAMPLE 7, COMPARATIVE EXAMPLES 4–5

There is provided a pneumatic tires (Example 7) having a tire size of 120/70ZR17 and a structure shown in FIG. 8, wherein a carcass is comprised of two plies each containing nylon cords arranged at a cord angle of 80° with respect to an equatorial plane of the tire and wound around a bead core from an inside of the tire toward an outside thereof and a belt is constituted with a spiral belt layer of an aromatic polyamide fiber cord and a bead filler having a Shore A hardness of 95° is arranged at an outside of a turnup portion of an outermost carcass ply. This tire is mounted onto a front wheel of a motorcycle (HONDA CB1100XX) and actually run at a high speed (250 km/h), during which the straight running stability, shimmy resistance, handling nimbleness/ response, cornering force/gripping force and ride comfort are measured by a professional rider together with a first comparative tire having the bead filler arranged between the carcass ply and the turnup portion thereof (Comparative Example 4) and a second comparative tire having no bead filler (Comparative Example 5).

Each of these properties is represented by an index on the basis that the second comparative tire is 100. The tire of Comparative Example 1 has the straight running stability of 130, shimmy resistance of 130, handling nimbleness/response of 130, cornering force/gripping force of 120 and ride comfort of about 90, while the tire of Example 7 has the straight running stability of 140, shimmy resistance of 140, handling nimbleness/response of 140, cornering force/gripping force of 130 and ride comfort of 85.

As to the high-speed straight running stability, in the tire according to the invention, the deformation in both lateral and torsional directions tends to become small and the absorption of wobbling (the wobbling is an oscillation of not more than 10 Hz in a whole of a frame and a handle produced at a high speed zone) is improved without decreasing the lateral force generated. As to the shimmy resistance, the tire deformation in the lateral and torsional directions is small and the amplitude in disturbance input tends to be mitigated. As to the handling nimbleness/response, the reaction of the vehicle body is improved in the steering of the handle. As to the cornering force/gripping force, the occurrence of lateral force becomes large and the falling-down inherent to the motorcycle in the cornering is decreased and the cornering force is improved.

As to the ride comfort, the thrusting in the riding on projection becomes somewhat sharp in the tires according to the invention as compared with the comparative tires, but since the tread portion is soft, the absolute level of the ride comfort is sufficiently put into practical use.

As mentioned above, according to the invention, the straight running stability is sufficiently enhanced, and also the occurrence of shimmy can effectively be prevented when the tire is used in the front wheel of the motorcycle.

What is claimed is:

1. A pneumatic front wheel motorcycle tire comprising a pair of bead cores embedded in a pair of bead portions, a carcass toroidally extending between the pair of bead portions and wound around the bead core from an inside of the tire toward an outside thereof, a belt disposed on an outer surface of a crown portion of the carcass in a radial direction of the tire, and a tread portion disposed on an outer surface of the belt in the radial direction, wherein the carcass is comprised of at least one carcass ply containing organic fiber cords arranged at a cord angle of 60–90° with respect to an equatorial plane of the tire, and the belt is a spiral belt layer formed by spirally winding a continuous rubberized cord or a continuous ribbon-shaped body containing plural cords therein in a widthwise direction of the tire so as to extend the cord substantially in a circumferential direction of the tire, and at least one reinforcing layer, each being symmetric with respect to the equatorial plane and disposed on the inside and directly adjacent an innermost carcass ply or on an inner surface of an innerlinner, having a width corresponding to 20–120% of a width of the spiral belt layer and is a rubber layer and or a rubberized cord layer.

2. A pneumatic tire according to claim 1, wherein the width of the reinforcing layer is 20–60% of the width of the spiral belt layer.

* * * * *